(12) United States Patent  (10) Patent No.: US 11,783,699 B2
Shirakata et al.  (45) Date of Patent: *Oct. 10, 2023

(54) INTERSECTION INFORMATION DISTRIBUTION APPARATUS AND INTERSECTION INFORMATION DISTRIBUTION METHOD

(71) Applicant: Panasonic Intellectual Property Corporation of America, Torrance, CA (US)

(72) Inventors: Naganori Shirakata, Kanagawa (JP); Koji Takinami, Kanagawa (JP); Kenichi Ono, Hyogo (JP); Noboru Yamamoto, Tokyo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 17/345,596

(22) Filed: Jun. 11, 2021

(65) Prior Publication Data

US 2021/0312803 A1 Oct. 7, 2021

Related U.S. Application Data

(63) Continuation of application No. 15/809,848, filed on Nov. 10, 2017, now Pat. No. 11,062,597.

(30) Foreign Application Priority Data

Nov. 21, 2016 (JP) ................................ 2016-225921

(51) Int. Cl.
G08G 1/04 (2006.01)
H04B 7/06 (2006.01)
(Continued)

(52) U.S. Cl.
CPC ............... *G08G 1/04* (2013.01); *G06V 20/54* (2022.01); *G08G 1/0112* (2013.01);
(Continued)

(58) Field of Classification Search
CPC ...... G08G 1/04; G08G 1/0112; G08G 1/0116; G08G 1/0141; G08G 1/0145;
(Continued)

(56) References Cited

U.S. PATENT DOCUMENTS 4,704,610 A 11/1987 Smith et al.
5,648,767 A 7/1997 O'Connor et al.
(Continued)

FOREIGN PATENT DOCUMENTS

JP 2008-233017 A 10/2008
JP 2009-070243 A 4/2009
(Continued)

OTHER PUBLICATIONS

Extended European Search Report, dated Mar. 27, 2018, for European Application No. 17200987.0, 9 pages.
(Continued)

*Primary Examiner* — Rami Khatib
(74) *Attorney, Agent, or Firm* — Seed IP Law Group LLP

(57) ABSTRACT

An intersection information distribution apparatus includes a plurality of image capturers, one or more first wireless communicators, a position estimator, and a controller. The plurality of image capturers capture images in and around an intersection. The one or more first wireless communicators perform directional communication with a second wireless communicator mounted on a vehicle. The position estimator estimates a position of the vehicle in and around the intersection from a communication state of the directional communication. The controller selects a piece of data from among pieces of data of the images captured by the plurality
(Continued)

of image capturers on the basis of the estimated position of the vehicle. The one or more first wireless communicators transmit the selected piece of data to the second wireless communicator of the vehicle.

19 Claims, 9 Drawing Sheets

(51) Int. Cl.
*G08G 1/0967* (2006.01)
*G08G 1/01* (2006.01)
*H04W 8/00* (2009.01)
*G06V 20/54* (2022.01)
*H04B 7/08* (2006.01)
*H04W 84/00* (2009.01)

(52) U.S. Cl.
CPC ......... *G08G 1/0116* (2013.01); *G08G 1/0141* (2013.01); *G08G 1/0145* (2013.01); *G08G 1/09675* (2013.01); *G08G 1/096716* (2013.01); *G08G 1/096741* (2013.01); *G08G 1/096783* (2013.01); *H04B 7/0617* (2013.01); *H04W 84/00* (2013.01); *H04B 7/0695* (2013.01); *H04B 7/088* (2013.01)

(58) Field of Classification Search
CPC ....... G08G 1/096716; G08G 1/096741; G08G 1/09675; G08G 1/096783; G08G 1/093; G06V 20/54; H04B 7/0617; H04B 7/0695; H04B 7/088; H04W 84/00
See application file for complete search history.

(56) References Cited

U.S. PATENT DOCUMENTS

| | | | |
|---|---|---|---|
| 5,926,113 | A | 7/1999 | Jones et al. |
| 6,008,741 | A | 12/1999 | Shinagawa et al. |
| 6,442,473 | B1 | 8/2002 | Berstis et al. |
| 6,621,420 | B1 | 9/2003 | Poursartip |
| 8,031,062 | B2 | 10/2011 | Smith |
| 9,232,406 | B2 | 1/2016 | Karabinis |
| 9,478,130 | B2 | 10/2016 | McDevitt-Pimbley et al. |
| 2009/0140881 | A1 | 6/2009 | Sakai et al. |
| 2010/0256852 | A1 | 10/2010 | Mudalige |
| 2010/0315215 | A1 | 12/2010 | Yuda |
| 2011/0016343 | A1 | 1/2011 | Hoch |
| 2013/0128599 | A1 | 5/2013 | Park et al. |
| 2013/0261856 | A1 | 10/2013 | Sharma et al. |
| 2014/0032021 | A1 | 1/2014 | Metzler et al. |
| 2017/0299689 | A1 | 10/2017 | Va et al. |
| 2017/0327038 | A1 | 11/2017 | Karabed |
| 2018/0115065 | A1 | 4/2018 | Valdes Garcia et al. |

FOREIGN PATENT DOCUMENTS

| | | |
|---|---|---|
| JP | 2011-61604 A | 3/2011 |
| JP | 2016143088 A * | 8/2016 |

OTHER PUBLICATIONS

English Translation of Chinese Search Report, dated Mar. 9, 2022, for the related Chinese Patent Application No. 201710880289.4, 2 pages.

* cited by examiner

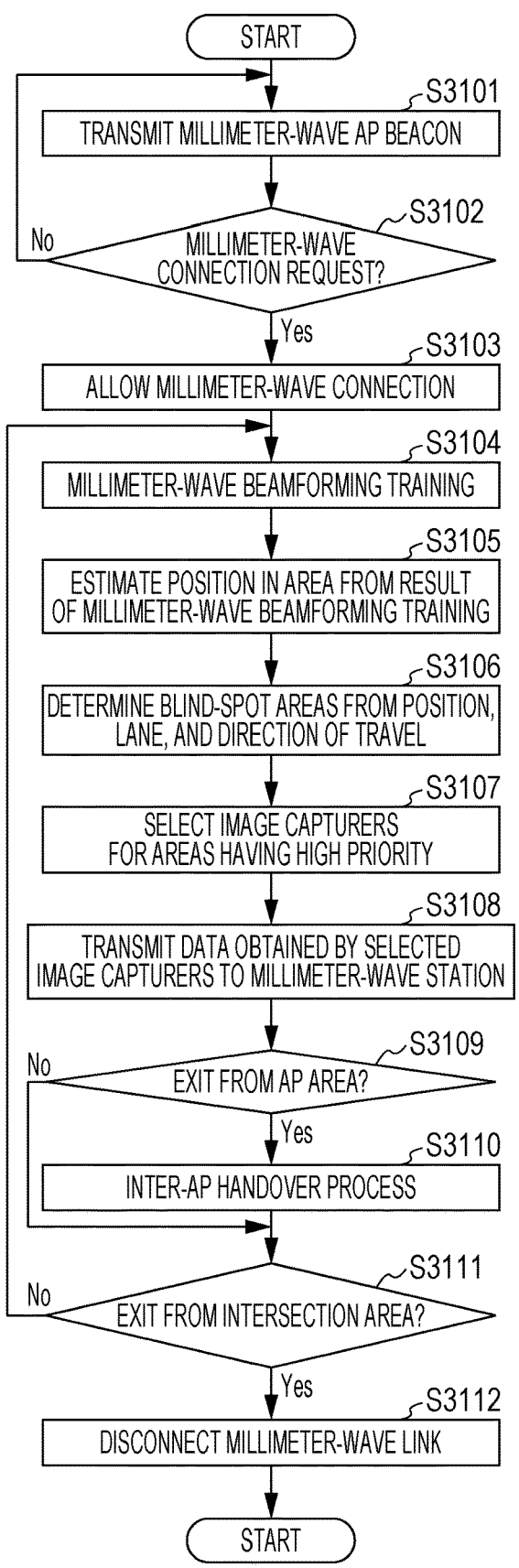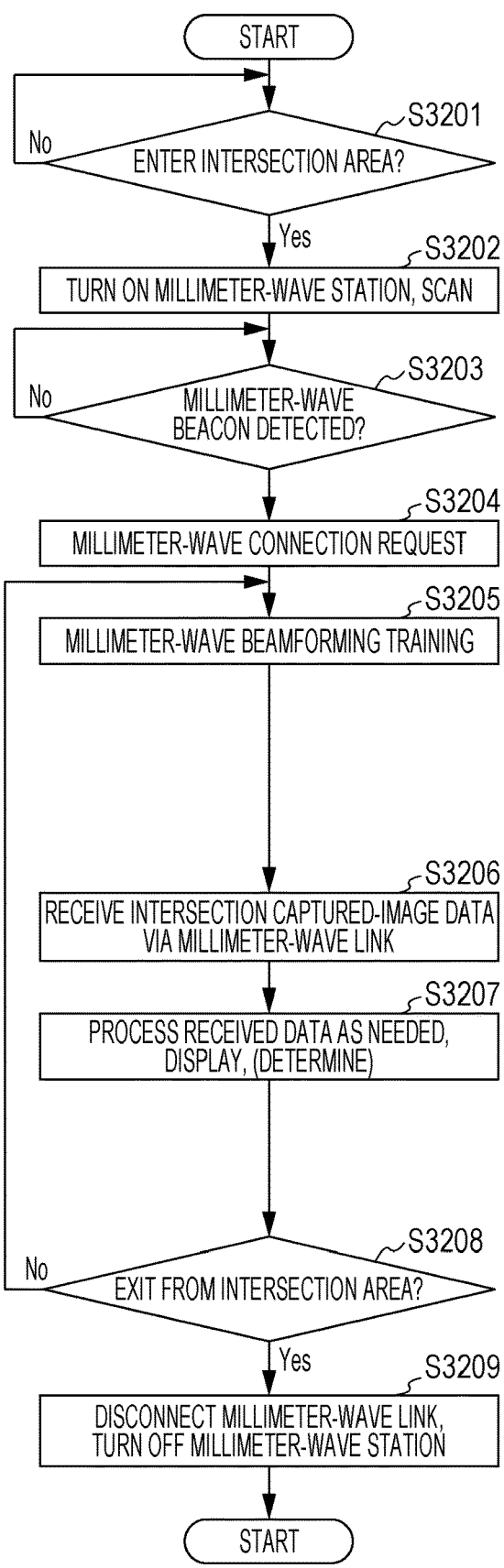

FIG. 4
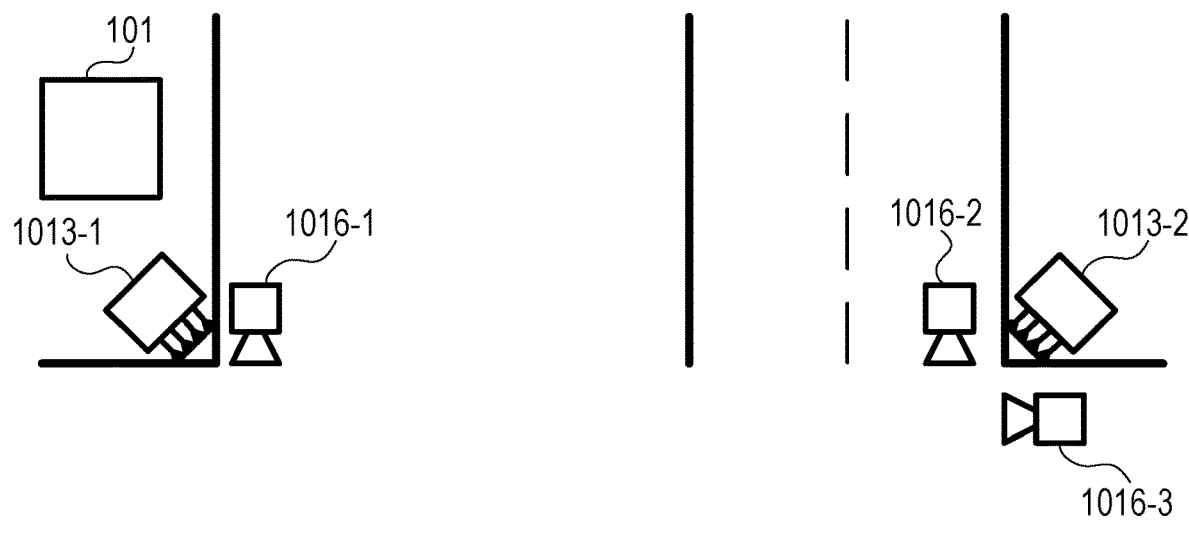
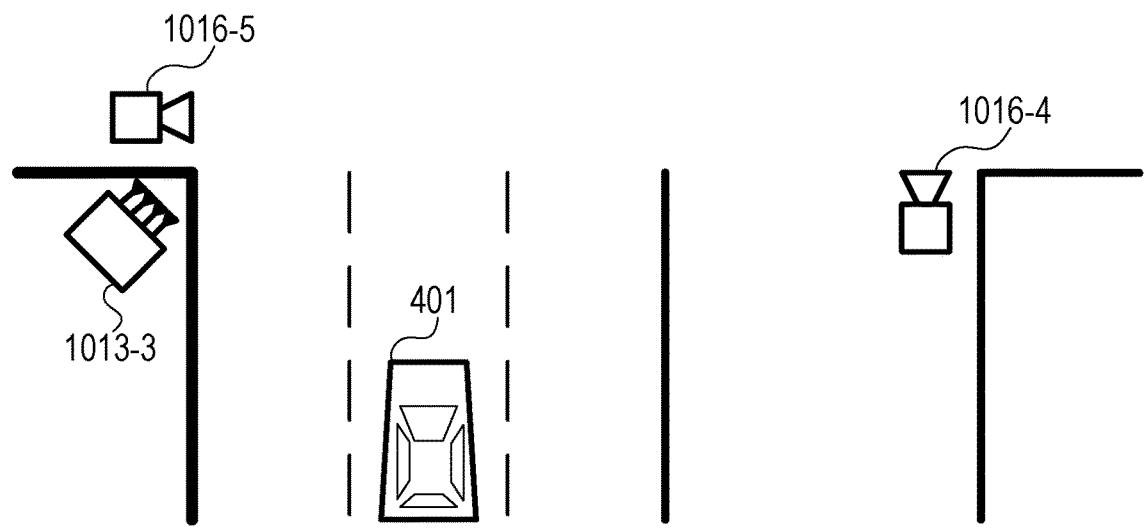

INTERSECTION INFORMATION DISTRIBUTION APPARATUS AND INTERSECTION INFORMATION DISTRIBUTION METHOD

BACKGROUND

1. Technical Field

The present disclosure relates to an intersection information distribution apparatus and an intersection information distribution method, and particularly relates to an apparatus and a method for quickly distributing information, such as images of an intersection and its surroundings, to a movable body, such as a vehicle.

2. Description of the Related Art

As an intersection information distribution apparatus according to the related art, an intersection information distribution apparatus according to Japanese Patent No. 5204060 selects an antenna from among a plurality of directional antennas in response to a request from a service application on the basis of a distribution target area, a communication area, and a transmission power associated in advance and uses the selected antenna to distribute data of, for example, images of an intersection and its surroundings to vehicles.

However, the intersection information distribution apparatus according to Japanese Patent No. 5204060 does not take into consideration an increase in the number of pieces of image data of captured images, and therefore, it is difficult to distribute image data useful for driving assistance at an intersection where accidents frequently occur.

SUMMARY

In one general aspect, the techniques disclosed here feature an intersection information distribution apparatus that includes a plurality of image capturers, one or more first wireless communicators, a position estimator, and a controller. The plurality of image capturers capture images in and around an intersection. The one or more first wireless communicators perform directional communication with a second wireless communicator mounted on a vehicle. The position estimator estimates a position of the vehicle in and around the intersection from a communication state of the directional communication. The controller selects a piece of data from among pieces of data of the images captured by the plurality of image capturers on the basis of the estimated position of the vehicle. The one or more first wireless communicators transmit the selected piece of data to the second wireless communicator of the vehicle.

According to one aspect of the present disclosure, a piece of information among a plurality of pieces of intersection information can be distributed in accordance with the position of a vehicle in or around an intersection.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3A is a flowchart illustrating an example operation flow of a roadside apparatus;

FIG. 3B is a flowchart illustrating an example operation flow of an onboard apparatus;

FIG. 4 is a diagram illustrating an example arrangement in and around an intersection;

DETAILED DESCRIPTION

Examples of information content related to driving assistance for vehicles (hereinafter referred to as driving assistance information) include image data of high-resolution images captured at various angles, sensing data from sensors (for example, radars), 3D map data, and sensing data for automatic driving. The volume of such driving assistance information is expected to increase.

In order to broadcast and distribute all pieces of driving assistance information to a plurality of vehicles in and around an intersection at which accidents frequently occur, a large number of conditions, such as the communication band, the processing time, and radio interference, need to be taken into consideration, and it is desirable to distribute necessary driving assistance information to vehicles that need information.

Driving assistance information needed differs depending on the position of a vehicle in or around the intersection, namely, whether the vehicle is traveling straight ahead, making a right-hand turn, or making a left-hand turn, or a lane in which the vehicle is present, for example.

Accordingly, regarding distribution of driving assistance information, a solution for achieving both position estimation of a distribution target vehicle in and around an intersection and high-speed wireless communication is under study.

Embodiment

Hereinafter, an embodiment of the present disclosure will be described with reference to the drawings.

Figure 1:
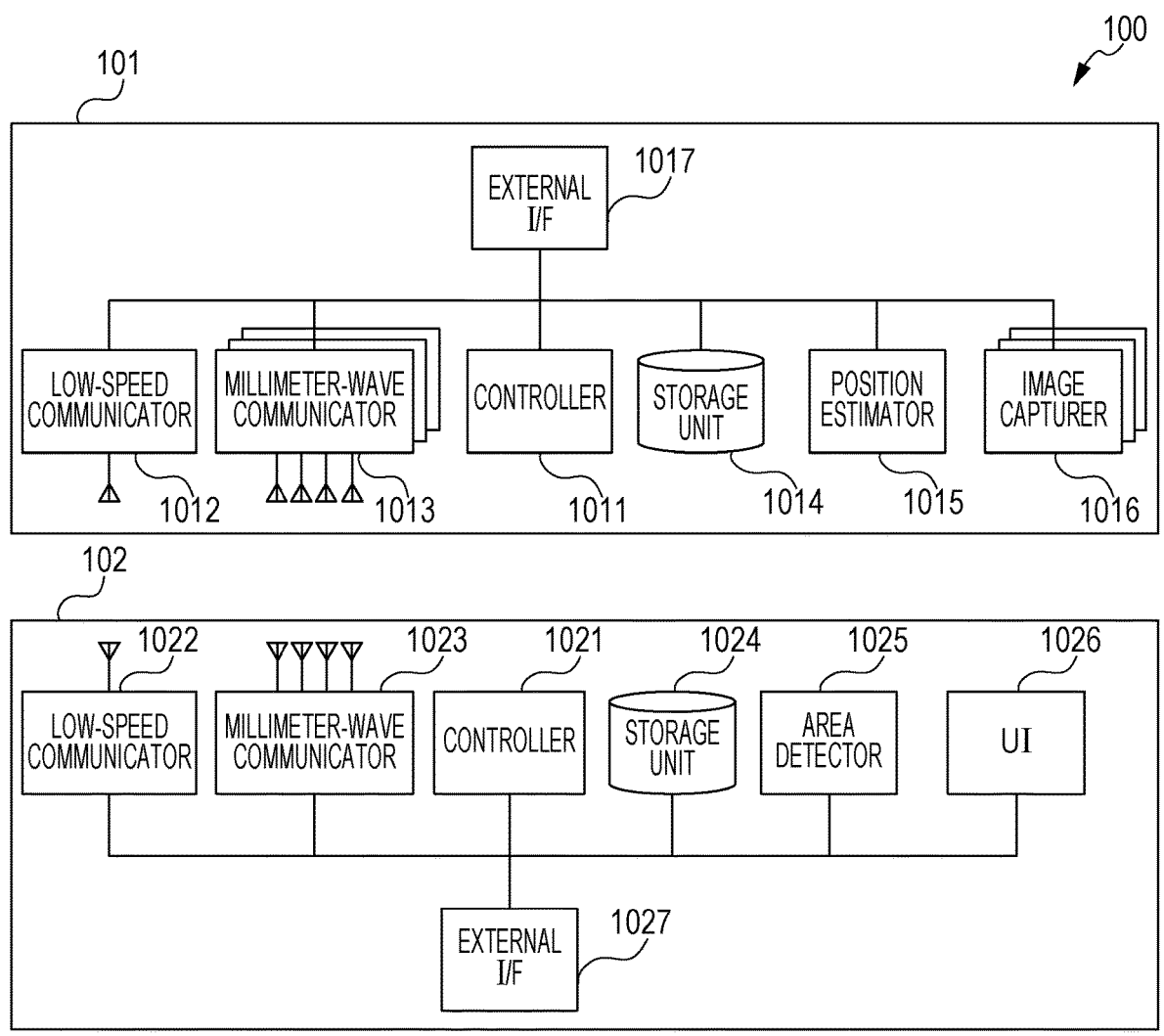
FIG. 1 is a diagram illustrating an example of an intersection information distribution system according to an embodiment of the present disclosure.

FIG. 1 is a block diagram illustrating a configuration of an intersection information distribution system 100. The intersection information distribution system 100 includes a roadside apparatus (also referred to as an intersection information distribution apparatus) 101 and an onboard apparatus 102. The roadside apparatus 101 includes a controller 1011, a low-speed communicator 1012, a plurality of millimeter-wave communicators 1013, a storage unit 1014, a position estimator 1015, a plurality of image capturers 1016, and an external interface (I/F) 1017. The onboard apparatus 102 includes a controller 1021, a low-speed communicator 1022, a millimeter-wave communicator 1023, a storage unit 1024, an area detector 1025, a user interface (UI) 1026, and an external I/F 1027.

The roadside apparatus (intersection information distribution apparatus) 101 transmits to the onboard apparatus 102 via the plurality of millimeter-wave communicators 1013 driving assistance information obtained by the plurality of image capturers 1016 capturing images of areas that are blind spots around an intersection. For example, areas that are blind spots differ depending on the position of the vehicle, and driving assistance information needed differs accordingly. Therefore, the position estimator 1015 estimates the position of the onboard apparatus 102, and the roadside apparatus 101 selects and transmits a piece of driving assistance information needed from among pieces of driving assistance information stored in the storage unit 1024 in accordance with the position of the vehicle.

The onboard apparatus 102 processes driving assistance information received via the millimeter-wave communicator 1023 into information needed for assisting the driver and communicates the information to the driver via the UI 1026.

The low-speed communicators 1012 and 1022 perform wireless communication with each other at a low communication speed by using a communication system for a wide communication area. As the communication system, Zigbee, Bluetooth (registered trademark), Dedicated Short Range Communication (DSRC), Wi-Fi, such as IEEE 802.11p or IEEE 802.11/b/g/a/n/ac, or a cellular system, such as 3G or Long Term Evolution (LTE), can be used, for example.

Here, the low communication speed is a communication speed that is lower than that of the millimeter-wave communicators 1013 and 1023 and ranges, for example, from several tens of kbps to several tens of Mbps or so. The wide communication area is an area that is wider than that of the millimeter-wave communicators 1013 and 1023 and is a communication area ranging, for example, from several tens of meters to several tens of kilometers. The low-speed communicators 1012 and 1022 need not have a low communication speed and need to have a communication area wider than that of the millimeter-wave communicators 1013 and 1023.

The millimeter-wave communicators 1013 and 1023 perform wireless communication with each other at a high communication speed by using a communication system for a narrow communication area. As the communication system, IEEE 802.11ad/WiGig using a millimeter wave can be used, for example. Here, the high communication speed needs to be a communication speed that is higher than that of the low-speed communicators 1012 and 1022 and ranges, for example, from several hundreds of Mbps to several Gbps or so.

The narrow communication area is an area that is narrower than that of the low-speed communicators 1012 and 1022 and is a communication area of, for example, several meters or so. The millimeter-wave communicators 1013 and 1023 each have a plurality of antennas and perform directional control by using beamforming. The millimeter-wave communicators 1013 and 1023 need not have a narrow communication area and need to have a communication speed higher than that of the low-speed communicators 1012 and 1022.

The storage units 1014 and 1024 store driving assistance information and so on and are each constituted by, for example, a volatile memory, a nonvolatile memory, a solid state drive (SSD), or a hard disk drive (HDD). As the driving assistance information, data of moving images captured by using video cameras and digitized at various resolutions, digital data which is obtained by radars and sensors performing measurements and from which distances and directions are obtained, 3D moving image data obtained by combining the above-described pieces of data, or data that includes map information created in advance as 3D data can be used, for example.

The image capturers 1016 are provided for generating driving assistance information. As the image capturers 1016, video cameras used to capture images of a plurality of blind-spot areas around an intersection, radars for measuring a plurality of blind-spot areas around an intersection, sensors for detecting vehicles in lanes, and sensors for detecting persons on sidewalks can be used, for example. The plurality of image capturers 1016 are installed at various positions in and around an intersection so as to allow capturing of images of a large number of blind-spot areas.

The position estimator 1015 estimates the position of the onboard apparatus 102, which is a communication partner. In order to estimate the position, the result of directional control performed by the millimeter-wave communicators 1013, changes in the communication state of the millimeter-wave communicators 1013, and changes in the communication state of the low-speed communicator 1012 can be used, for example. As the changes in the communication state, changes in the reception quality during communication (the received radio wave strength, received signal strength indicator (RSSI), signal-to-noise ratio (SNR), signal-to-interference-plus-noise ratio (SINR), and packet error rate) can be used, for example. Position estimation using information obtained by the millimeter-wave communicators 1013 covers, for example, areas in and around an intersection, and position estimation using information obtained by the low-speed communicator 1012 covers, for example, a wider area that includes an intersection.

The external I/F 1017 is an interface for connection with external devices. The external I/F 1017 connects with an external network, such as the Internet, via, for example, an Ethernet line or a dedicated line. The external I/F 1017 is not limited to a wired interface, and a wireless connection interface may be used.

The controller 1011 controls each component of the roadside apparatus 101. The controller 1011 is typically constituted by a central processing unit (CPU) and a software program and may be constituted by a hardware unit, such as a dedicated large-scale integration (LSI) circuit or a field-programmable gate array (FPGA). The controller 1011 and each component need not be connected via a wired connection and may be connected via a wireless connection.

The area detector 1025 detects an intersection area in which the roadside apparatus 101 is present. The area detector 1025 may detect an intersection by using a generally available navigation system or a generally available device capable of obtaining global positioning system (GPS) information. The area detector 1025 may include units for detecting movement of the onboard apparatus 102, such as an acceleration sensor, a gyro sensor, and a geomagnetism sensor, not illustrated and may detect whether the onboard apparatus 102 moves into an intersection area or moves out of an intersection area by using output from the sensors. Further, the area detector 1025 may detect an intersection area by using information regarding the communication state of the low-speed communicators 1012 and 1022.

The UI 1026 displays driving assistance information to the driver of the vehicle and is used to perform operations for driving assistance. The UI 1026 may be constituted by a display panel, a light emitting diode (LED), a touch panel, a key pad, a keyboard, a switch, and/or an audio input/output. Alternatively, the UI 1026 may be constituted by the user interface of a navigation system installed in the vehicle or the dashboard or a display panel in front of the driver's seat. In a case of a vehicle capable of automatic driving, the UI 1026 may be constituted by an interface of a controller for automatic driving.

The external I/F 1027 is an interface for connection with external devices. The external I/F 1027 may be constituted by, for example, an Ethernet line or a dedicated line, a network interface, such as a controller area network (CAN) in the vehicle, or a peripheral device interface, such as an RS232C interface or a USB interface. The external I/F 1027 need not be a wired interface, and a wireless connection interface may be used.

The controller 1021 controls each component of the onboard apparatus 102. The controller 1021 is typically constituted by a CPU and a software program and may be constituted by a hardware unit, such as a dedicated LSI circuit or an FPGA. The controller 1021 and each component need not be connected via a wired connection and may be connected via a wireless connection.

Figure 2:
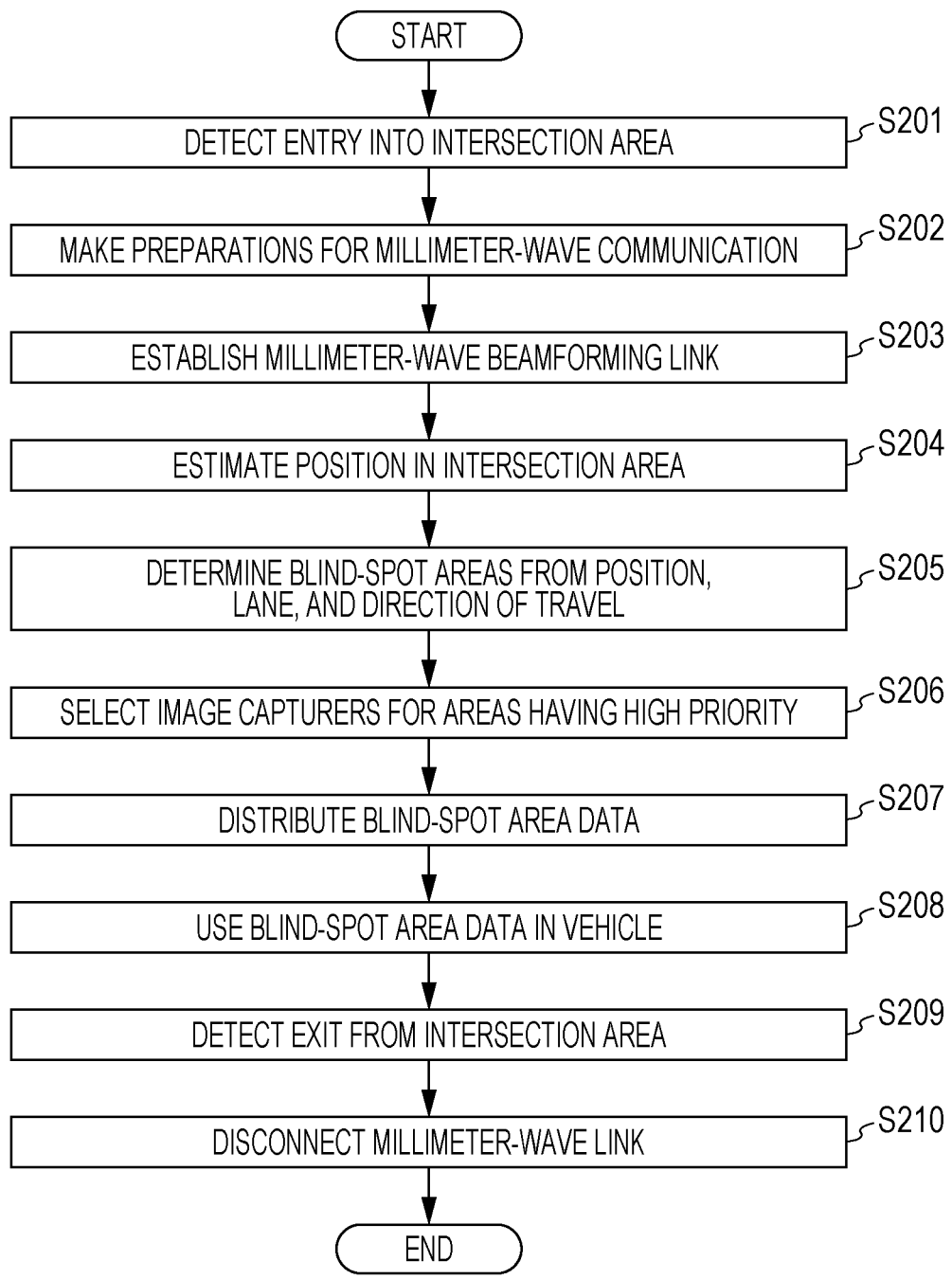
FIG. 2 is a flowchart illustrating an example operation flow of an intersection information distribution system.

FIG. 2 is a flowchart illustrating an example of driving assistance information distribution performed in the intersection information distribution system 100. Here, an operation of the entire system is described.

In step S201, the area detector 1025 of the onboard apparatus 102 detects an entry into an intersection area.

In step S202, the onboard apparatus 102 makes preparations for millimeter-wave communication between the onboard apparatus 102, which has entered the intersection area, and the roadside apparatus 101. For example, the onboard apparatus 102 turns on the power of the millimeter-wave communicator 1023 and searches for a millimeter-wave communication area.

In step S203, the millimeter-wave communicators 1013 and 1023 perform beamforming training for millimeter-wave communication and establish a radio link. The millimeter-wave communicators 1013 and 1023 each perform directional control to select a beam direction in which optimal reception quality for communication can be obtained.

In step S204, the position estimator 1015 of the roadside apparatus 101 estimates the position of the onboard apparatus 102. The position estimator 1015 obtains position information about the estimated position in the intersection area from information regarding the beam direction obtained as a result of the beamforming training.

In step S205, the position estimator 1015 of the roadside apparatus 101 determines the lane and the direction of travel in and around the intersection from the estimated position of the onboard apparatus 102 and determines blind-spot areas of the vehicle in which the onboard apparatus 102 is mounted on the basis of the result of determination.

In step S206, the controller 1011 prioritizes and selects a predetermined number of the image capturers 1016 among the plurality of image capturers 1016 that are capturing images of the determined blind-spot areas on the basis of the result of determination by the position estimator 1015.

In step S207, the millimeter-wave communicators 1013 distribute driving assistance information regarding the blind-spot areas for which images have been captured by the selected image capturers 1016 to the onboard apparatus 102.

In step S208, the onboard apparatus 102 processes the driving assistance information received via the millimeter-wave communicator 1023 as needed and displays the resulting information to the driver via the UI 1026 for use in driving assistance.

In step S209, the area detector 1025 of the onboard apparatus 102 detects an exit from the intersection area. Steps S203 to S209 are repeated during a period in which the onboard apparatus 102 is staying in the intersection area.

In step S210, in case where the onboard apparatus 102 has exited from the intersection area, the millimeter-wave communicator 1023 disconnects the millimeter-wave link and ends the intersection information distribution operation.

FIG. 4 illustrates an example arrangement of the roadside apparatus 101 and an example position relationship with a vehicle on which the onboard apparatus 102 is mounted, in and around an intersection. A process flow of the roadside apparatus 101 and that of the onboard apparatus 102 are described below.

FIG. 4 illustrates an example arrangement in and around an intersection. FIG. 4 is an overhead view of an intersection around which a vehicle keeps to the left side of the road and at which roads cross each other. Three millimeter-wave communicators 1013-1 to 1013-3 are installed in the corners of the intersection on poles at a height of about 3 to 5 meters that is substantially equal to a height at which traffic signals are installed. Further, five video cameras (image capturers 1016-1 to 1016-5) are also installed on poles and capture images of the states of the roads in different directions.

The millimeter-wave communicators 1013 and the image capturers 1016 of the roadside apparatus 101 are connected to one another via wired or wireless connections not illustrated, and the other components are housed in the roadside apparatus 101. The onboard apparatus 102 is mounted on a target vehicle 401 on the road.

When the target vehicle 401 enters the intersection, the intersection information distribution system starts operating. In FIG. 4, the number of the millimeter-wave communicators 1013 is three, and the number of the image capturers 1016 is five; however, the number of the millimeter-wave communicators 1013 and the number of the image capturers 1016 are not limited to these and can be adjusted in accordance with the structure of the intersection and the system design specifications.

FIG. 3A is a flowchart illustrating a process flow of the roadside apparatus 101, and FIG. 3B is a flowchart illustrating a process flow of the onboard apparatus 102. Steps S3101 to S3112 correspond to the process flow of the roadside apparatus 101, and steps S3201 to S3209 correspond to the process flow of the onboard apparatus 102.

In step S3201, the onboard apparatus 102 determines whether the onboard apparatus 102 has entered an intersection area 501 (see FIG. 5) on the basis of output from the area detector 1025. In case where the onboard apparatus 102 has not entered the intersection area 501 (No in step S3201), the onboard apparatus 102 repeats step S3201. In case where the onboard apparatus 102 has entered the intersection area 501 (Yes in step S3201), the flow proceeds to step S3202.

In step S3101, the roadside apparatus 101 periodically (for example, at intervals of 100 msec) transmits to access point (AP) areas of the roadside apparatus 101 via the millimeter-wave communicators 1013 beacons indicating, for example, the address of the roadside apparatus 101 and information necessary for connection. In step S3102, the roadside apparatus 101 determines whether a connection request has been made from the onboard apparatus 102.

In step S3202, the onboard apparatus 102 turns on the power of the millimeter-wave communicator 1023 and searches for a millimeter-wave communication area. Specifically, the millimeter-wave communicator 1023 scans beacons transmitted from the millimeter-wave communicators 1013. In step S3203, in case where the millimeter-wave communicator 1023 has detected a beacon, the flow proceeds to step S3204. In case where the millimeter-wave communicator 1023 has not detected a beacon (No in step S3203), the onboard apparatus 102 repeats step S3203. This operation may be terminated in response to the process being stopped by a timer not illustrated or in response to detection of an exit from the intersection area.

In step S3204, the onboard apparatus 102 makes a connection request to the millimeter-wave communicator 1013 of the roadside apparatus 101 that has transmitted the beacon received by the millimeter-wave communicator 1023. For example, the millimeter-wave communicator 1023 includes the address of the onboard apparatus 102 in a control packet for requesting connection as the address of the connection destination and transmits the control packet.

In step S3102, in case where the roadside apparatus 101 receives the control packet for requesting connection from the onboard apparatus 102 via the millimeter-wave communicator 1013 and determines that a connection request has been made (Yes in step S3102), the flow proceeds to step S3103.

In step S3103, the roadside apparatus 101 allows the millimeter-wave communicator 1013 to connect with the onboard apparatus 102. For example, the millimeter-wave communicator 1013 includes the address of the roadside apparatus 101 in a control packet for allowing connection as the address of the connection destination and transmits the control packet, and the millimeter-wave communicator 1023 of the onboard apparatus 102 receives the control packet. The connection process is performed accordingly, and a radio link is established.

The roadside apparatus 101 and the onboard apparatus 102 each perform beamforming training for selecting a beam used in communication in step S3104 and in step S3205, respectively. The millimeter-wave communicators 1013 and 1023 each select a beam having the highest reception quality by using, for example, sector level sweep (SLS), which is a protocol used in IEEE 802.11ad/WiGig, and feeding back to each other the result of reception of a plurality of training packets transmitted using different beams.

Figure 6:
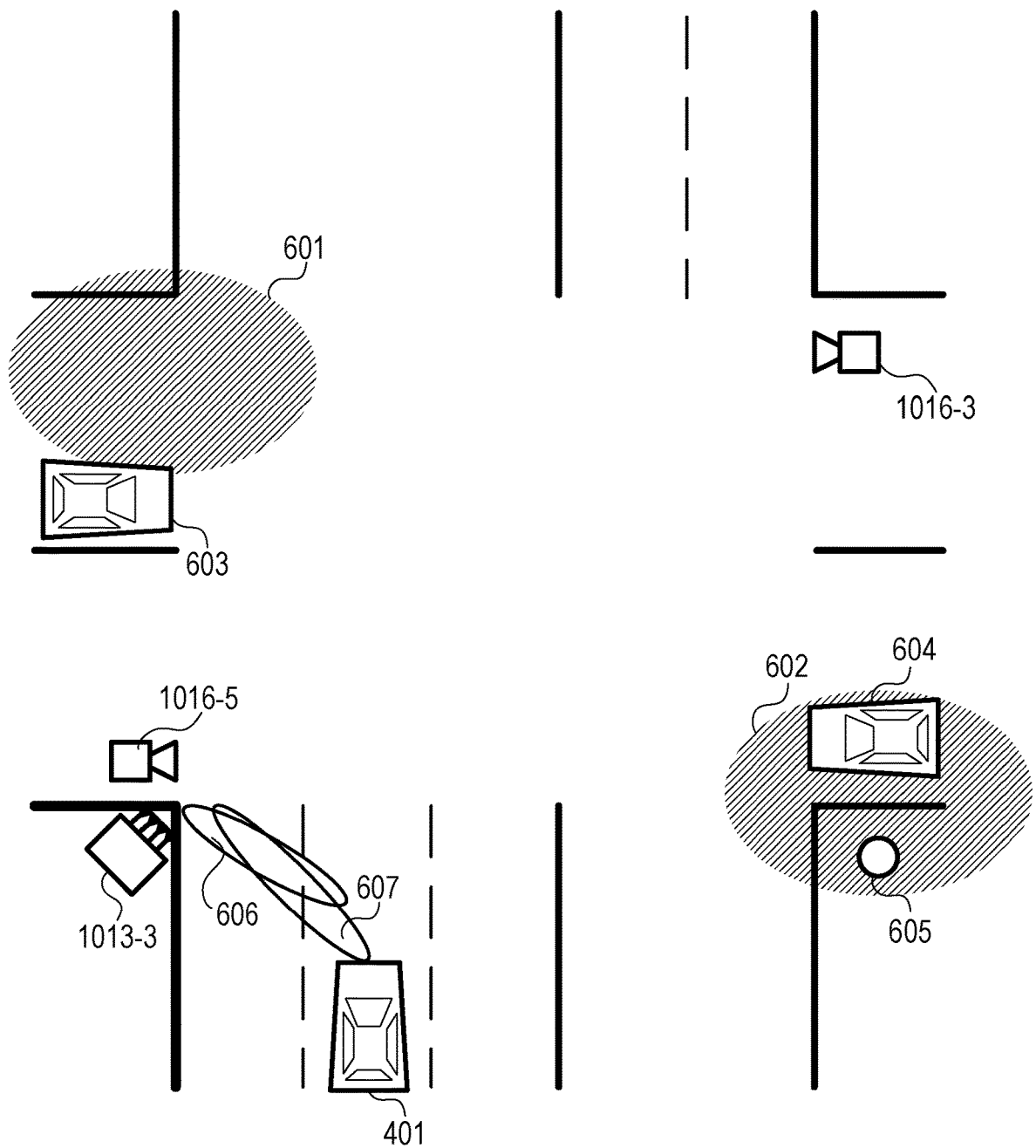
FIG. 6 is a diagram illustrating an example system operation for a vehicle traveling straight ahead.

For example, in a case where the target vehicle 401 performs beamforming training with the millimeter-wave communicator 1013-3, as illustrated in FIG. 6, the millimeter-wave communicator 1013-3 selects the beam 606 and the millimeter-wave communicator 1023 of the target vehicle 401 selects the beam 607 to thereby perform millimeter-wave communication having good reception quality.

The beamforming training in step S3104 and that in step S3205 are periodically performed during a period in which the target vehicle 401 is staying in the intersection area, and selected beams change moment by moment in accordance with the position of the target vehicle 401.

Figure 7:
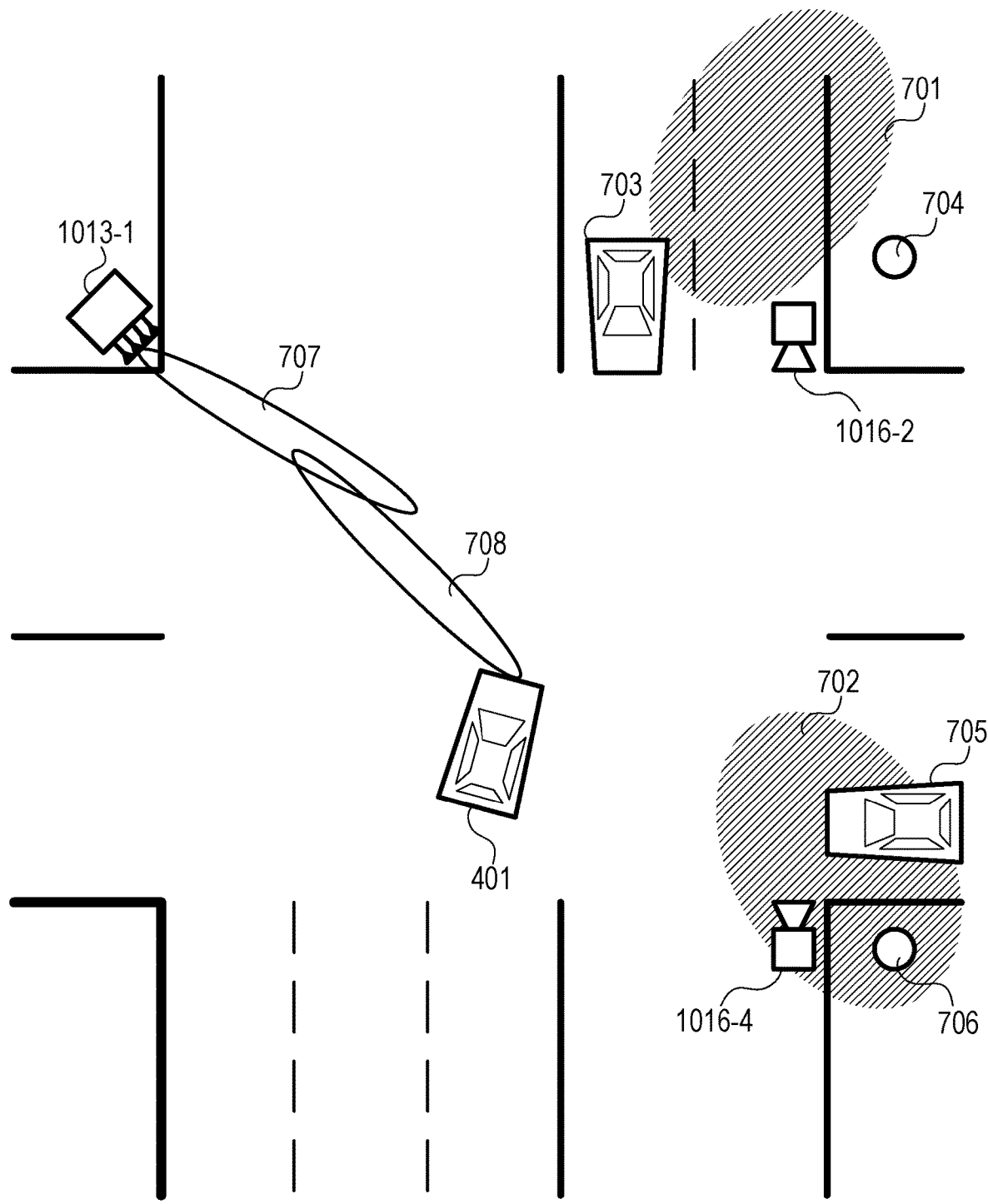
FIG. 7 is a diagram illustrating an example system operation for a vehicle making a right-hand turn.
Figure 8:
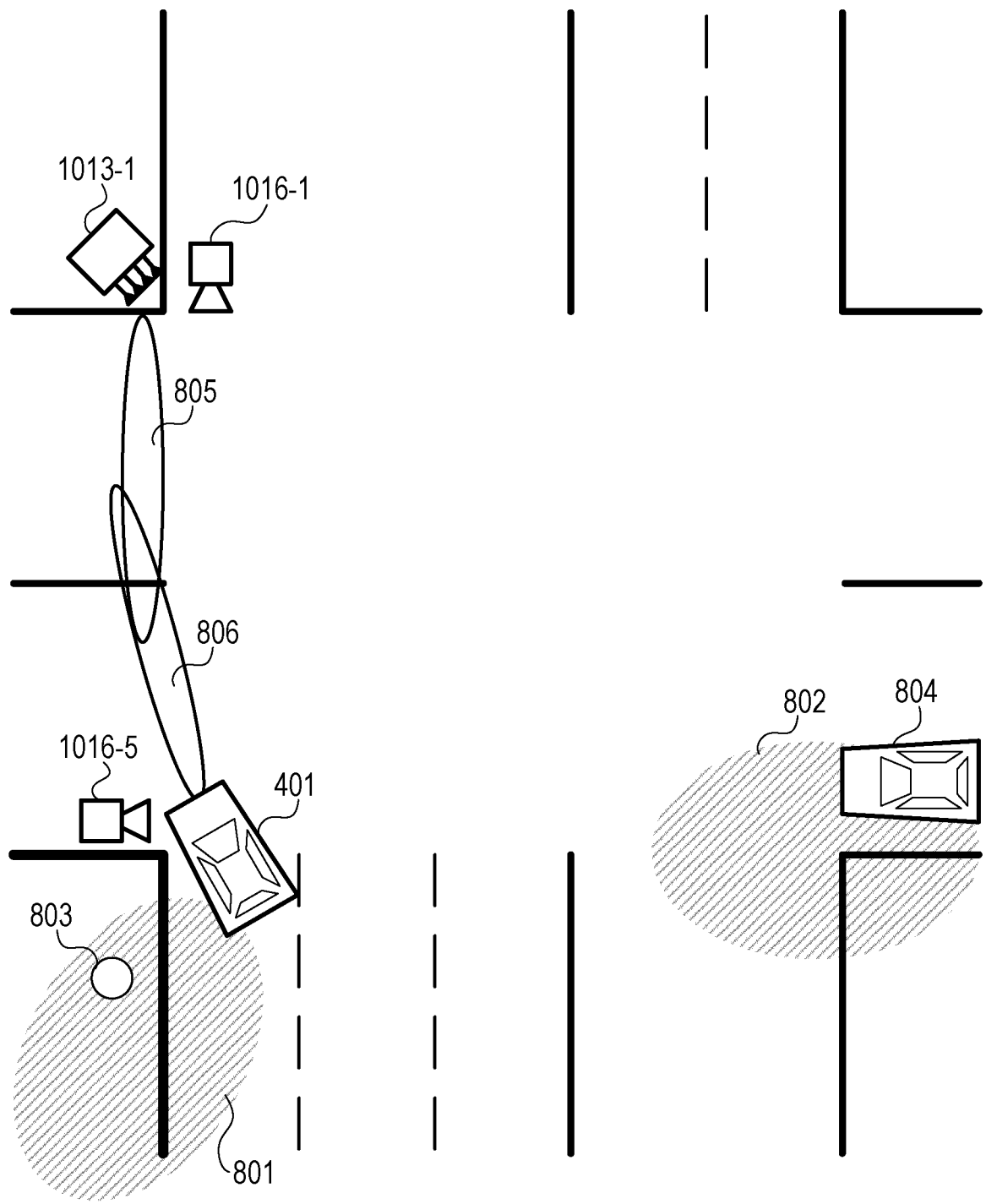
FIG. 8 is a diagram illustrating an example system operation for a vehicle making a left-hand turn.

For example, in a case where the target vehicle 401 is located at the center of the intersection for making a right-hand turn, as illustrated in FIG. 7, the millimeter-wave communicator 1013-1 selects the beam 707, and the millimeter-wave communicator 1023 of the target vehicle 401 selects the beam 708 in the left front direction. For example, in a case where the target vehicle 401 is located in the corner of the intersection for making a left-hand turn, as illustrated in FIG. 8, the millimeter-wave communicator 1013-1 selects the beam 805, and the millimeter-wave communicator 1023 of the target vehicle 401 selects the beam 806 in the front direction.

In step S3105, the position estimator 1015 of the roadside apparatus 101 estimates the position of the target vehicle 401 from the result of beamforming training. In FIG. 6, FIG. 7, and FIG. 8, combinations of selected beams differ depending on the position of the target vehicle 401, and the position estimator 1015 estimates the position of the target vehicle 401 on the basis of the beam selected by the millimeter-wave communicator 1013-1 or 1013-3.

Figure 5:
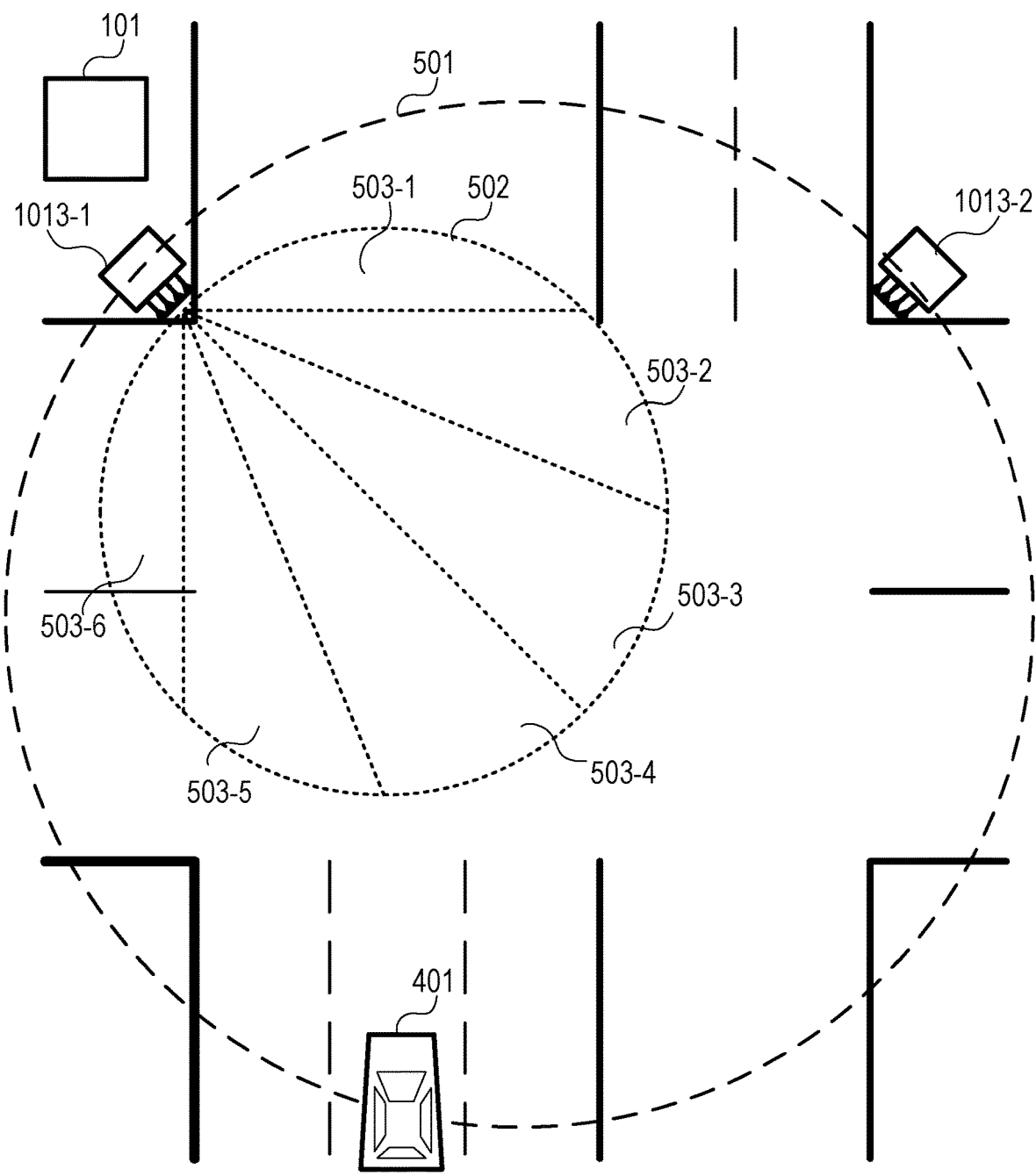
FIG. 5 is a diagram illustrating an example communication area.

For example, on the basis of the combination of the beam 707 and the beam 708 illustrated in FIG. 7, the position estimator 1015 can estimate that the target vehicle 401 is highly likely to be located in a beam area 503-3 among beam areas 503-1 to 503-6 illustrated in FIG. 5. Further, the position estimator 1015 can estimate the position of the target vehicle 401 with a higher accuracy by estimating the distance on the basis of the reception quality (for example, the received radio wave strength, RSSI, SNR, and SINR) in communication using beamforming and further estimating the angle of arrival of the radio wave.

Alternatively, the position estimator 1015 can combine the results of beamforming training by the millimeter-wave communicators 1013-1 to 1013-3 and estimate the position on the basis of the combinations of the beams.

In step S3106, the position estimator 1015 of the roadside apparatus 101 determines blind-spot areas of the target vehicle 401 on the basis of the estimated position of the target vehicle 401. The blind-spot areas change in accordance with the position at which the target vehicle 401 is present, the lane, and the direction of travel.

For example, in FIG. 6, the target vehicle 401 is in the straight through lane and enters the intersection, and therefore, the area 601 on the left-hand road and the area 602 on the right-hand road are blind-spot areas. The area 601 is behind the vehicle 603, and therefore, is a non-visible area. Regarding the area 602, when the target vehicle 401 enters the intersection, the vehicle 604 and the pedestrian 605 in the area 602 are located to the right of the target vehicle 401 and disappear from the driver's sight accordingly. Therefore, attention needs to be paid.

In FIG. 7, the area 701 behind the vehicle 703 in the opposite lane and the area 702 located to the right of the target vehicle 401 are blind-spot areas. The pedestrian 704 is outside the area 701, and the vehicle 705 and the pedestrian 706 are located in the area 702. In FIG. 8, the area 801 in the left rear direction of the target vehicle 401 that is making a left-hand turn and the area 802 on the right-hand road in the right rear direction of the target vehicle 401 that is making a left-hand turn are blind-spot areas. The pedestrian 803 is located in the area 801, and the vehicle 804 is located in the area 802.

In step S3107, the controller 1011 of the roadside apparatus 101 prioritizes and selects the image capturers 1016 that are capturing images of blind-spot areas when the target vehicle 401 is located at the estimated position from among the plurality of image capturers 1016. For example, in FIG. 6, the image capturer 1016-3 capturing an image of the area 601 and the image capturer 1016-5 capturing an image of the area 602 are assigned a high priority from the viewpoint of driving assistance for the target vehicle 401, and therefore, are selected. In FIG. 7, the image capturer 1016-4 capturing an image of the area 701 and the image capturer 1016-2 capturing an image of the area 702 are selected. In FIG. 8, the image capturer 1016-1 capturing an image of the area 801 and the image capturer 1016-5 capturing an image of the area 802 are selected.

In step S3108, the roadside apparatus 101 transmits data obtained by the selected image capturers 1016, that is, driving assistance information regarding the blind-spot areas for which images have been captured by the selected image capturers 1016, to the onboard apparatus 102 via the millimeter-wave communicator 1013.

In step S3206, the onboard apparatus 102 receives intersection captured-image data (driving assistance information) transmitted from the millimeter-wave communicator 1013 via the millimeter-wave communicator 1023.

In step S3207, the onboard apparatus 102 processes the received data (driving assistance information) as needed and uses in driving assistance, namely, displays the resulting data to the driver, for example. The driving assistance information may be processed by the controller 1011 or by the UI 1026 or may be processed by an information processor not illustrated via the external I/F 1027.

The processing performed as needed includes, for example, an operation of converting the viewpoint of a captured image of a blind-spot area to a viewpoint that does not make the driver feel unnatural. Alternatively, an operation of detecting, recognizing, and determining a target object that is an obstacle from a captured image of a blind-spot area, and thereafter, communicating the obstacle to the driver via the UI 1026 may be performed. Communicating such information can allow safer driving by the driver.

In step S3109, the position estimator 1015 of the roadside apparatus 101 determines whether the target vehicle 401 has exited from the communication area of one of the millimeter-wave communicators 1013 and has entered the communication area of another one of the millimeter-wave communicators 1013. For example, in FIG. 9, the target vehicle 401-1 performs communication in the AP area 502 of the millimeter-wave communicator 1013-1. At this time, the millimeter-wave communicator 1013-1 selects the beam 707, and the millimeter-wave communicator 1023 of the target vehicle 401-1 selects the beam 708.

Thereafter, the millimeter-wave communicator 1023 of the target vehicle 401-2, which is the target vehicle after movement, has difficulty in communicating with the millimeter-wave communicator 1013-1 using the beam 708. The roadside apparatus 101 and the onboard apparatus 102 periodically perform beamforming training (step S3104 and step S3205) to determine the state where communication becomes difficult due to movement of the vehicle. Accordingly, the possibility of the target vehicle 401 exiting from the AP area can be determined.

In case where the position estimator 1015 of the roadside apparatus 101 determines that the possibility of an exit from the AP area is high (Yes in step S3109), the flow proceeds to step S3110. In case where the position estimator 1015 of the roadside apparatus 101 determines that the target vehicle is staying within the same AP area (No in step S3109), the flow proceeds to step S3111.

In step S3110, the roadside apparatus 101 performs a handover process between AP areas via the plurality of millimeter-wave communicators 1013. For example, in FIG. 9, the roadside apparatus 101 changes connection information for the millimeter-wave communicator 1023 of the target vehicle 401, namely, changes the connection destination from the millimeter-wave communicator 1013-1 to the millimeter-wave communicator 1013-2 of the roadside apparatus 101.

Figure 9:
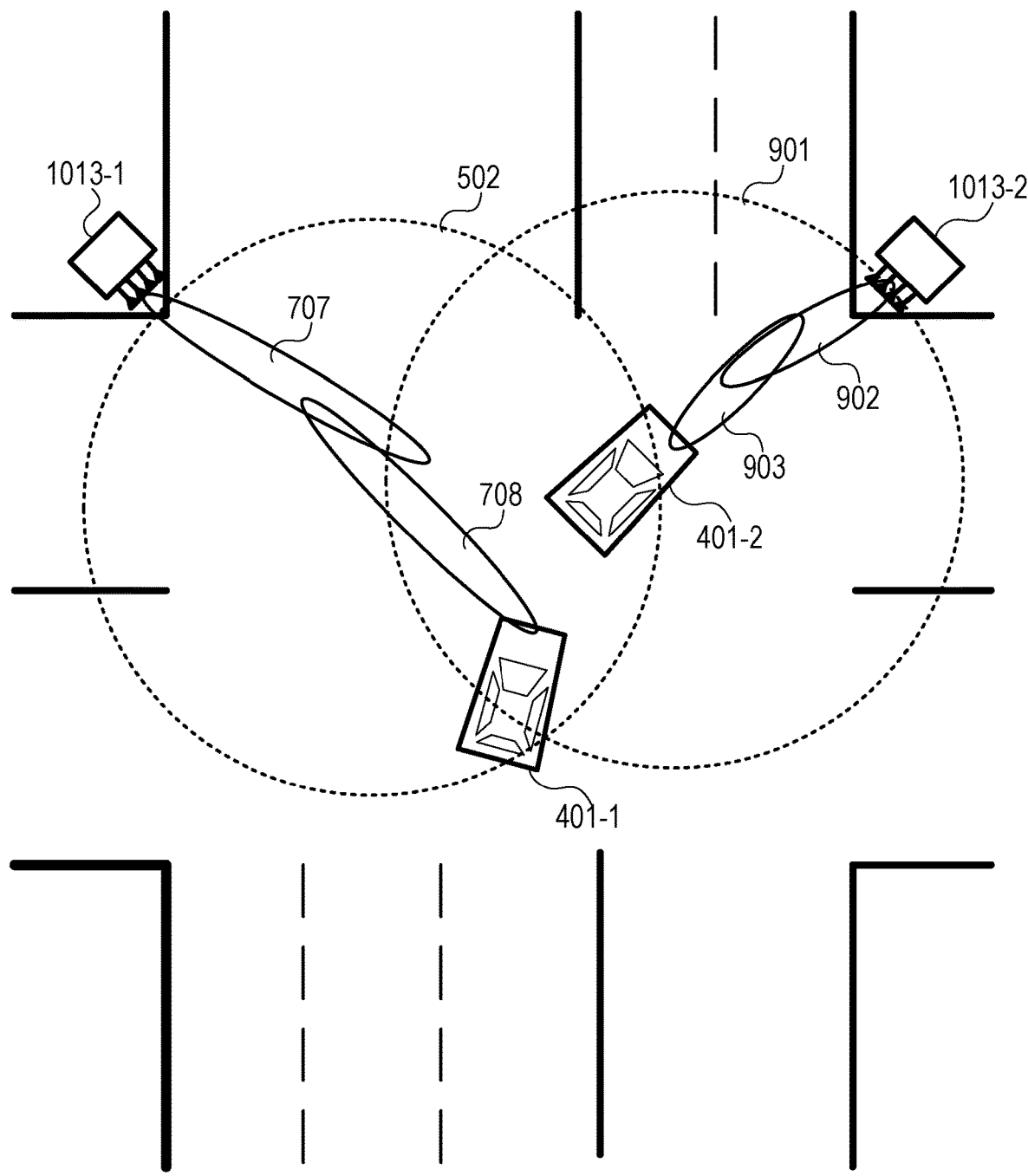
FIG. 9 is a diagram illustrating an example handover operation for a vehicle making a right-hand turn.

In FIG. 9, the target vehicle 401 moves from the AP area 502 to the AP area 901 while making a right-hand turn. The AP area 901 is the communication area of the millimeter-wave communicator 1013-2. When a handover is performed, the target vehicle 401 performs beamforming training for connection with the millimeter-wave communicator 1013-2. Accordingly, the millimeter-wave communicator 1013-2 selects the beam 902, and the millimeter-wave communicator 1023 of the target vehicle 401 selects the beam 903 to thereby establish a radio link.

In step S3111, the position estimator 1015 of the roadside apparatus 101 determines whether the target vehicle 401 has exited from the intersection area. In case where the target vehicle 401 has exited from the intersection area (Yes in step S3111), the flow proceeds to step S3112. In case where the target vehicle 401 has not exited from the intersection area (No in step S3111), the flow returns to step S3104, and the process is repeated.

In step S3208, the area detector 1025 of the onboard apparatus 102 also determines whether the onboard apparatus 102 has exited from the intersection area. In case where the onboard apparatus 102 has exited from the intersection area (Yes in step S3208), the flow proceeds to step S3209. In case where the onboard apparatus 102 has not exited from the intersection area (No in step S3208), the flow returns to step S3205, and the process is repeated.

In step S3112, the roadside apparatus 101 disconnects the millimeter-wave link with the target vehicle via the millimeter-wave communicator 1013.

In step S3209, the onboard apparatus 102 disconnects the millimeter-wave link with the roadside apparatus 101 via the millimeter-wave communicator 1023. The onboard apparatus 102 turns off the power of the millimeter-wave communicator 1023 to decrease power consumption.

The flow of the series of processes has been chronologically described with reference to the flowcharts in FIGS. 3A and 3B. The series of processes is performed for a plurality of target vehicles, and therefore, each process may be performed by a plurality of controllers in parallel.

Example Applications

The embodiment described above can be applied to example operations described below.

On the basis of data of moving images captured by a high-precision image capturing device of the roadside apparatus, the controller 1011 or an information processor, not illustrated, connected to the roadside apparatus via the external I/F 1017 detects and identifies one or more objects present in and/or around an intersection, and the roadside apparatus distributes driving assistance information including information about the objects (for example, information about whether the objects are vehicles, pedestrians, or obstacles) to the onboard apparatus.

The onboard apparatus mounted in a vehicle that is approaching an intersection transmits position information about the vehicle obtained by a satellite positioning system, such as a global navigation satellite system (GNSS), to the roadside apparatus via low-speed wireless communication, such as cellular communication, before the vehicle enters the intersection. In a case of receiving preliminary information from the onboard apparatus, the roadside apparatus expects the vehicle to enter the intersection and starts capturing images in and around the intersection at the timing when the vehicle enters the intersection.

The onboard apparatus mounted on a vehicle that is approaching an intersection transmits in advance position information about the vehicle obtained by using retained map information, such as a dynamic map, to the roadside apparatus via low-speed wireless communication, such as cellular communication, before the vehicle enters the intersection. In a case of receiving preliminary information from the onboard apparatus, the roadside apparatus expects the vehicle to enter the intersection and starts capturing images in and around the intersection at the timing when the vehicle enters the intersection.

In a case where the low-speed communicator of the roadside apparatus receives a radio wave of, for example, Bluetooth Low Energy (BLE) transmitted from a mobile device or the like carried by a person present in or around an intersection, the image capturers of the roadside apparatus start capturing images of the intersection and its surroundings, and the controller 1011 or an information processor, not illustrated, connected to the roadside apparatus via the external IF 1017 detects and identifies the person present in or around the intersection. The millimeter-wave communicator of the roadside apparatus communicates driving assistance information including the result of detection and identification to the onboard apparatus in or around the intersection.

In a case where the roadside apparatus determines that a warning needs to be issued in and around the intersection on the basis of at least one of the result of detection and identification of data from the image capturers, the preliminary information from the vehicle received by the low-speed communicator, and the radio wave from the mobile device carried by the person (for example, in a case where an object that is traveling in a direction at a speed significantly different from those in the usual traffic condition is identified), the roadside apparatus distributes driving assistance information in which the priority levels of the blind-spot areas are changed to the onboard apparatus in or around the intersection.

In a case where a vehicle in which a rear detector not illustrated in the onboard apparatus 102 in FIG. 1 is mounted is located in or around an intersection and is detecting objects in the rear detection area, the UI 1026 preferentially displays rear-detection information. In a case where the objects move out of the rear detection area, the UI 1026 preferentially displays driving assistance information received from the roadside apparatus.

The embodiment has been described above with reference to the drawings; however, the present disclosure is not limited to the above-described embodiment. It is obvious that a person skilled in the art can conceive various modifications and alterations within the scope set forth in the claims, and it is understood that such modifications and alternations also fall within the technical scope of the present disclosure, as a matter of course. Further, any components in the above-described embodiment may be combined as appropriate without departing from the spirit of the present disclosure.

In the above-described embodiment, the example configuration of the present disclosure in which hardware units are used has been described; however, the present disclosure can be implemented by using software in cooperation with hardware.

The functional blocks used in the description of the above-described embodiment are typically implemented as an LSI circuit, which is an integrated circuit having an input terminal and an output terminal. The integrated circuit controls the functional blocks used in the description of the above-described embodiment and may have an input and an output. Each of the functional blocks may be implemented as a single chip, or some or all of the functional blocks may be integrated into a single chip. Although the integrated circuit is called an LSI circuit here, the integrated circuit may be called an IC, an LSI circuit, a super LSI circuit, or an ultra LSI circuit depending on the difference in the degree of integration.

Further, the technique for circuit integration is not limited to LSI, and circuit integration may be implemented by using a dedicated circuit or a general-purpose processor. An FPGA that is programmable after manufacturing the LSI, or a reconfigurable processor for which connections and settings of circuit cells within the LSI can be reconfigured may be used.

In a case where a technique for circuit integration that replaces LSI emerges with the advancement of semiconductor technology or on the basis of any technology that is separately derived, the functional blocks may be integrated by using the technique, as a matter of course. Application of, for example, biotechnology is possible.

Various aspects of the embodiment of the present disclosure include the following.

An intersection information distribution apparatus according to a first aspect of the present disclosure includes: a plurality of image capturers that capture images in and around an intersection; one or more first wireless communicators that perform directional communication with a second wireless communicator mounted on a vehicle; a position estimator that estimates a position of the vehicle in and around the intersection from a communication state of the directional communication; and a controller that selects a piece of data from among pieces of data of the images captured by the plurality of image capturers on the basis of the estimated position of the vehicle. The one or more first wireless communicators transmit the selected piece of data to the second wireless communicator of the vehicle.

An intersection information distribution apparatus according to a second aspect of the present disclosure is the intersection information distribution apparatus according to the first aspect in which the position estimator estimates the position of the vehicle on the basis of directions of directional beams used by the first wireless communicators.

An intersection information distribution apparatus according to a third aspect of the present disclosure is the intersection information distribution apparatus according to the first aspect in which the plurality of image capturers capture images of different areas in and around the intersection.

An intersection information distribution method according to a fourth aspect of the present disclosure includes: capturing images by a plurality of image capturers in and around an intersection; performing directional communication by a second wireless communicator mounted on a vehicle and by one or more first wireless communicators of an intersection information distribution apparatus; estimating a position of the vehicle in and around the intersection from a communication state of the directional communication; selecting a piece of data from among pieces of data of the images captured by the plurality of image capturers on the basis of the estimated position of the vehicle; and transmitting the selected piece of data to the second wireless communicator of the vehicle.

An intersection information distribution method according to a fifth aspect of the present disclosure is the intersection information distribution method according to the fourth aspect in which the position of the vehicle is estimated on the basis of directions of directional beams used by the first wireless communicators.

An intersection information distribution method according to a sixth aspect of the present disclosure is the intersection information distribution method according to the fourth aspect in which the pieces of data of the images captured by the plurality of image capturers are pieces of data of images of different areas in and around the intersection.

The present disclosure is preferably used in a mobile communication system.

The invention claimed is:

1. An apparatus comprising:
   capturing devices arranged at an intersection and configured to capture information in and around the intersection, the capturing devices being one of video cameras, radars, or sensors;
   one or more first millimeter-wave communicators arranged at the intersection and configured to perform directional communication with a second millimeter-wave communicator mounted on a vehicle using a directional beam; and
   a circuit housed in a roadside apparatus at the intersection and configured to:
      estimate, in response to an area detector mounted on the vehicle detecting entry of the vehicle into the intersection, a position of the vehicle in and around the intersection on a basis of a communication state of the directional beam used in the directional communication; and
      select a piece of data from among pieces of data corresponding to the information captured by the capturing devices on a basis of the estimated position of the vehicle, wherein
   the one or more first millimeter-wave communicators transmit the selected piece of data to the second millimeter-wave communicator mounted on the vehicle, and
   the area detector mounted on the vehicle detects the intersection by using a navigation system, a device capable of obtaining global positioning system (GPS) information, or units for detecting movement of the vehicle or communication state of a low speed communicator.

2. The apparatus according to claim 1, wherein the circuit is configured to estimate the position of the vehicle on a basis of a direction of the directional beam used in the directional communication.

3. The apparatus according to claim 1, wherein the capturing devices capture information of different areas in and around the intersection.

4. The apparatus according to claim 1, wherein
   in a case where the estimated position of the vehicle is in a corner of the intersection for making a left-hand turn, the selected piece of data corresponds to an area in a left rear of the vehicle and to an area in a right rear of the vehicle, and
   in a case where the estimated position of the vehicle is at a center of the intersection for making a right-hand turn, the selected piece of data corresponds to an area behind another vehicle in an opposite lane of the vehicle and to an area right of the vehicle.

5. The apparatus according to claim 1, wherein the circuit is configured to estimate the position of the vehicle in and around the intersection based on at least one of a strength, a signal-to-noise ratio (SNR), or a signal-to-interference-plus-noise ratio (SINK) of the direction beam.

6. The apparatus according to claim 1, wherein:
   the circuit is further configured to:
      determine a lane in which the vehicle is present and a direction of travel in and around the intersection from the estimated position of the vehicle; and
      determine one or more blind-spot areas of the vehicle on a basis of a result of the determination of the lane and the direction of travel, and
   the selecting includes selecting the piece of data from among pieces of data corresponding to the information that are capturing information of the one or more blind-spot areas on a basis of a result of the determination of the one or more blind-spot areas.

7. The apparatus according to claim 1, wherein the capturing devices are cameras configured to capture images in and around the intersection.

8. The apparatus according to claim 1, wherein the capturing devices are radars configured to measure blind-spot areas in and around the intersection.

9. The apparatus according to claim 1, wherein the capturing devices are sensors configured to detect vehicles or persons in and around the intersection.

10. A method comprising:
    capturing, by a plurality of capturing devices arranged at an intersection, information in and around the intersection;
    performing, by one or more first millimeter-wave communicators arranged at the intersection, directional communication with a second millimeter-wave communicator mounted on a vehicle using a directional beam;
    estimating, by a circuit housed in a roadside apparatus at the intersection, in response to an area detector mounted on the vehicle detecting entry of the vehicle into the intersection, a position of the vehicle in and around the intersection on a basis of a communication state of the directional beam used in the directional communication;
    selecting, by the circuit housed in the roadside apparatus at the intersection, a piece of data from among pieces of data corresponding to the information captured by the plurality of capturing devices on a basis of the estimated position of the vehicle; and
    transmitting, by the one or more first millimeter-wave communicators, the selected piece of data to the second millimeter-wave communicator of the vehicle, wherein the area detector detects the intersection by using a navigation system, a device capable of obtaining global positioning system (GPS) information, or units for detecting movement of the vehicle or communication state of a low speed communicator.

11. The method according to claim 10, wherein estimating the position of the vehicle includes estimating the position of the vehicle on a basis of a direction of the directional beam used in the directional communication.

12. The method according to claim 10, wherein
    the pieces of data corresponding to the information captured by the plurality of capturing devices are pieces of data of information of different areas in and around the intersection.

13. The method according to claim 10, wherein
    in a case where the estimated position of the vehicle is in a corner of the intersection for making a left-hand turn, the selected piece of data corresponds to an area in a left rear of the vehicle and to an area in a right rear of the vehicle, and
    in a case where the estimated position of the vehicle is at a center of the intersection for making a right-hand turn, the selected piece of data corresponds to an area behind another vehicle in an opposite lane of the vehicle and to an area right of the vehicle.

14. The method according to claim 10, further comprising:
   determining a lane in which the vehicle is present and a direction of travel in and around the intersection from the estimated position of the vehicle; and
   determining one or more blind-spot areas of the vehicle on a basis of a result of the determination of the lane and the direction of travel, wherein
   the selecting includes selecting the piece of data from among pieces of data corresponding to the information that are capturing information of the one or more blind-spot areas on a basis of a result of the determination of the one or more blind-spot areas.

15. An apparatus comprising:
   capturing devices arranged at an intersection and configured to capture information in and around the intersection, the capturing devices being one of video cameras, radars, or sensors;
   one or more first millimeter-wave communicators arranged at the intersection and configured to perform directional communication with a second millimeter-wave communicator mounted on a vehicle using a directional beam;
   a processor housed in a roadside apparatus at the intersection; and
   a non-transitory recording medium housed in the roadside apparatus at the intersection and storing thereon a computer program which, when executed by the processor, causes the processor to:
      estimate, in response to an area detector mounted on the vehicle detecting entry of the vehicle into the intersection, a position of the vehicle in and around the intersection on a basis of a communication state of the directional beam used in the directional communication; and
      select a piece of data from among pieces of data corresponding to the information captured by the capturing devices on a basis of the estimated position of the vehicle,
   wherein the one or more first millimeter-wave communicators transmit the selected piece of data to the second millimeter-wave communicator mounted on the vehicle, wherein the area detector detects the intersection by using a navigation system, a device capable of obtaining global positioning system (GPS) information, or units for detecting movement of the vehicle or communication state of a low speed communicator.

16. The apparatus according to claim 15, wherein the position of the vehicle is estimated based on a direction of the directional beam used in the directional communication.

17. The apparatus according to claim 15, wherein the capturing devices capture information of different areas in and around the intersection.

18. The apparatus according to claim 15, wherein
   in a case where the estimated position of the vehicle is in a corner of the intersection for making a left-hand turn, the selected piece of data corresponds to an area in a left rear of the vehicle and to an area in a right rear of the vehicle, and
   in a case where the estimated position of the vehicle is at a center of the intersection for making a right-hand turn, the selected piece of data corresponds to an area behind another vehicle in an opposite lane of the vehicle and to an area in right of the vehicle.

19. The apparatus according to claim 15, wherein:
   the computer program, when executed by the processor, further causes the processor to:
      determine a lane in which the vehicle is present and a direction of travel in and around the intersection from the estimated position of the vehicle; and
      determine one or more blind-spot areas of the vehicle on a basis of a result of the determination of the lane and the direction of travel, and
   the selecting includes selecting the piece of data from among pieces of data corresponding to the information that are capturing information of the one or more blind-spot areas on a basis of a result of the determination of the one or more blind-spot areas.

* * * * *